United States Patent
Palankar et al.

(10) Patent No.: US 9,277,503 B2
(45) Date of Patent: Mar. 1, 2016

(54) DYNAMIC ZONE ROUTING IN A MOBILE AD HOC NETWORK BASED ON MAXIMUM AVAILABLE NETWORK DEVICE BATTERY POWER

(71) Applicant: Cisco Technology, Inc., San Jose, CA (US)

(72) Inventors: Ganesh Prasad Narayan Palankar, Karnataka (IN); Sahana Chandrashekar, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/064,041

(22) Filed: Oct. 25, 2013

(65) Prior Publication Data
US 2015/0117305 A1 Apr. 30, 2015

(51) Int. Cl.
*H04W 4/00* (2009.01)
*H04W 52/02* (2009.01)
*H04W 40/24* (2009.01)
*H04L 12/24* (2006.01)

(52) U.S. Cl.
CPC ........... *H04W 52/0261* (2013.01); *H04L 12/24* (2013.01); *H04W 40/24* (2013.01); *H04W 52/0219* (2013.01)

(58) Field of Classification Search
CPC .............................. H04W 40/24; H04L 12/24
USPC ......................................................... 370/328
See application file for complete search history.

(56) References Cited

U.S. PATENT DOCUMENTS

| | | | |
|---|---|---|---|
| 6,026,303 A * | 2/2000 | Minamisawa | 455/446 |
| 7,203,175 B2 | 4/2007 | Thubert et al. | |
| 7,924,722 B2 | 4/2011 | Thubert et al. | |
| 8,259,635 B2 | 9/2012 | Thubert et al. | |
| 2007/0291661 A1 * | 12/2007 | Nishibayashi et al. | 370/252 |

OTHER PUBLICATIONS

Garroppo et al., "Energy Aware Routing based on Energy Characterization of Devices: Solutions and Analysis", 2011 IEEE, 5 pages.
Wu et al., "On Calculating Power-Aware Connected Dominating Sets for Efficient Routing in Ad Hoc Wireless Networks", [online], 2002, [retrieved on Sep. 19, 2013]. Retrieved from the Internet: <URL: http://www.site.uottawa.ca/%7Eivan/KICS-Dai-preview.pdf>, 12 pages.
Singh et al., "Power-Aware Routing in Mobile Ad Hoc Networks", MobiCom '98 Proceedings of the 4th annual ACM/ IEEE international conference on Mobile computing and networking [online], [retrieved on Jul. 10, 2013]. Retrieved from the Internet: <URL: http://web.cecs.pdx.edu/~singh/ftp/mobicom98.pdf>, pp. 181-190.

(Continued)

*Primary Examiner* — Sai-Ming Chan
(74) *Attorney, Agent, or Firm* — Leon R. Turkevich (57) ABSTRACT

In one embodiment, a wireless network device identifies whether any other detectable network device advertises a higher advertised remaining power than a corresponding remaining power in the wireless network device. The wireless network device advertises as an active node for a zone of a wireless mobile ad hoc network, based on no other detectable network device advertising the higher advertised remaining power. The wireless network device also can advertise another wireless network device as a standby node for the zone, based on the other wireless network device advertising a lower advertised remaining power.

17 Claims, 7 Drawing Sheets

(56) References Cited

OTHER PUBLICATIONS

Varaprasad, "New Power Aware Routing Algorithm for MANETs Using Gateway Node", 2007 IEEE, 4 pages.
Ranjan, "Generic Architecture for Power-Aware Routing in Wireless Sensor Networks", [online], May 2004, [retrieved on Sep. 19, 2013]. Retrieved from the Internet: <URL: https://smartech.gatech.edu/bitstream/handle/1853/5001/ranjan_rishi_200407_ms.pdf>, 65 pages.

Restrepo et al., "Energy Profile Aware Routing", 2009 IEEE, 5 pages.
Vasseur et al., U.S. Appl. No. 13/834,578, filed Mar. 15, 2013.

* cited by examiner

DYNAMIC ZONE ROUTING IN A MOBILE AD HOC NETWORK BASED ON MAXIMUM AVAILABLE NETWORK DEVICE BATTERY POWER

TECHNICAL FIELD

The present disclosure generally relates to establishing a wireless mobile ad hoc network (MANET) among wireless network devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Ad hoc networks are infrastructure-less, decentralized, multi-hop wireless networks in which wireless network devices cooperatively maintain network connectivity. Various routing protocols have been proposed for mobile ad hoc networks (MANET), including Dynamic Source Routing (DSR), Destination-Sequenced Distance-Vector (DSDV), Temporally-Ordered Routing Algorithm (TORA), Signal Stability-Based Adaptive Routing (SSA), Dynamic Adaptive Routing Protocol (DARP), Ad Hoc On-Demand Distance-Vector (AODV) protocol, and Wireless Routing Protocol (WRP). MANET routing protocols such as DSR, DSDV, TORA, and WRP use hop count and/or delay as a routing metric, whereas SSA, DARP, and others use link quality and/or location stability as a metric. More recent proposals use power-aware metrics for determining routes in wireless ad hoc networks based on battery power consumption.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises identifying, by a wireless network device, whether any other detectable network device advertises a higher advertised remaining power than a corresponding remaining power in the wireless network device; the wireless network device advertising as an active node for a zone of a wireless mobile ad hoc network, based on no other detectable network device advertising the higher advertised remaining power.

In another embodiment, an apparatus comprises a battery power sensor configured for detecting a remaining power of a battery, a wireless network interface circuit configured for receiving wireless messages from any wireless network devices, and a processor circuit. The processor circuit configured for identifying whether any other detectable network device advertises a higher advertised remaining power than a corresponding remaining power detected by the battery power sensor, the processor circuit further configured for generating a message, for output by the wireless network interface circuit, advertising the apparatus as an active node for a zone of a wireless mobile ad hoc network, based on no other detectable network device advertising the higher advertised remaining power.

In yet another embodiment, logic is encoded in one or more non-transitory tangible media for execution by a machine and when executed by the machine operable for: identifying, by a wireless network device, whether any other detectable network device advertises a higher advertised remaining power than a corresponding remaining power in the wireless network device; and the wireless network device advertising as an active node for a zone of a wireless mobile ad hoc network, based on no other detectable network device advertising the higher advertised remaining power.

DETAILED DESCRIPTION

Particular embodiments optimize the maintaining of network connectivity in a wireless mobile ad hoc network based on maximizing use of network devices having a high battery power, and reducing the requirements of network devices having a lower battery power. Hence, the example embodiments can increase network lifetime and throughput by concentrating network traffic to wireless network devices having the largest remaining battery power.

Figure 1:
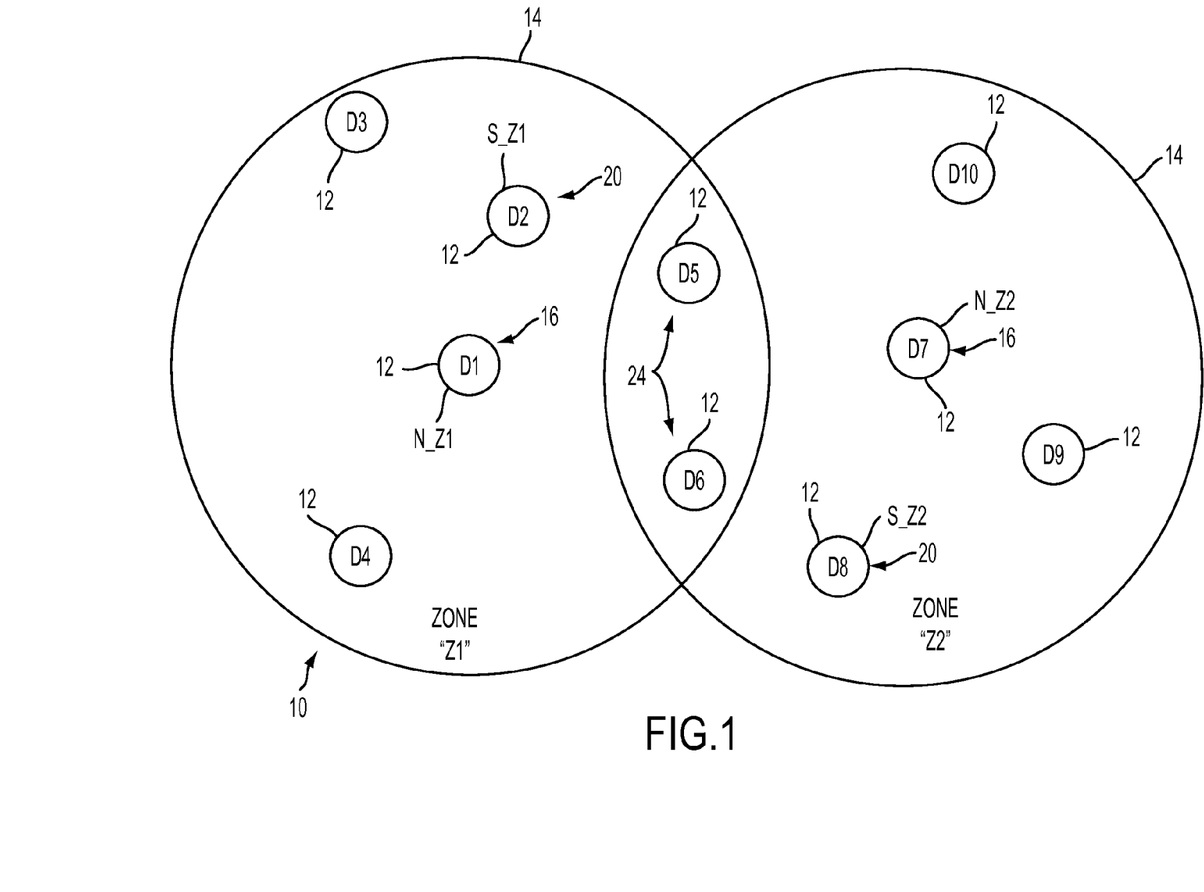
FIG. 1 illustrates an example system having an apparatus for advertising as an active node for a zone of a wireless mobile ad hoc network based on no other detectable network device advertising a higher advertised remaining battery power, according to an example embodiment.

FIG. 1 is a diagram illustrating an example wireless mobile ad hoc network (MANET) 10 having wireless network devices 12 configured for communication within wireless zones 14, according to an example embodiment. Each apparatus 12 is a physical machine (i.e., a hardware device) configured for implementing network communications with other physical machines 12 in the network 10.

Each zone 14 includes one and only one active node 16, where the zone is defined as the reception area of the active node 16. Hence, the wireless network device "D1" 12 as the active node "N_Z1" 16 defines the zone "Z1" 14 based on the wireless propagation/reception area of its corresponding wireless network interface circuit (18 of FIG. 4), and the wireless network device "D7" as the active node "N_Z2" 16 defines the zone "Z2" 14 based on the wireless propagation/reception area of its corresponding wireless network interface circuit (18 of FIG. 4). Hence, a solitary wireless network device 12 can establish its own coverage zone 14 in response to detecting no other detectable network device 12.

Each zone 14 also can include one and only one standby node (e.g., "S_Z1" of zone "Z1"; "S_Z2" of zone "Z2") 20 that can become an active node 16 if the remaining battery power (22 of FIG. 2) in the current active node falls below a prescribed threshold "T1" (24a of FIG. 2), described in further detail below. Each zone 14 also can include other wireless network devices 12 within the propagation zone 14 of an active node 16. Each zone 14 also can include one or more boundary nodes (e.g., "D5" and "D6") 24 that belong to two or more propagation zones 14, enabling the boundary nodes 24 to forward traffic between propagation zones 14.

Figure 2:
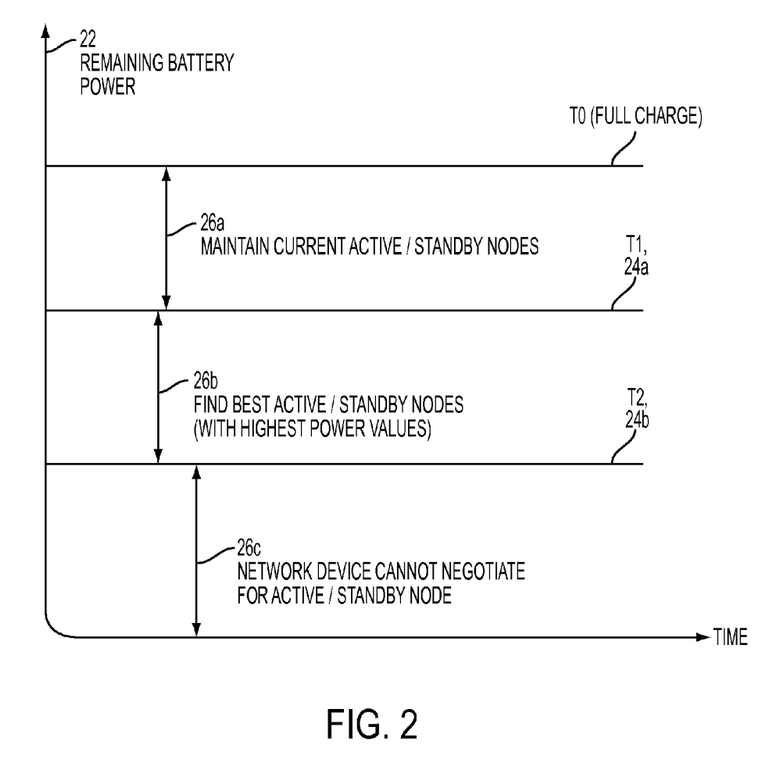
FIG. 2 illustrates example thresholds defining power zones for determining whether a wireless network device can be an active node and/or a standby node for a zone of a wireless mobile ad hoc network, according to an example embodiment.

FIG. 2 illustrates example thresholds 24 defining power zones 26 for determining whether a wireless network device 12 can be an active node 16 or a standby node 20 for a zone 14 of a wireless mobile ad hoc network 10, according to an example embodiment. As described in further detail below with respect to FIG. 5, a first threshold "T1" 24a defines whether the active node 16 and the current standby node 20 have sufficient remaining battery power 22 to retain their status if they are within a high-power zone 26a: if the remaining battery power 22 for the standby node 20 falls below the first threshold 24a into a contention zone 26b, then the active node 16 can trigger for causing a search (i.e., reelection) to find a new standby node among the other network devices 12 in the zone 14. If the remaining battery power 22 of a network device 12 falls below a second threshold "T2" 24b into a low-power zone 26c, then the network device cannot negotiate to become an active or standby node.

As described in further detail below, no network device 12 can forward a received data packet unless it is either an active node 16 of a zone 14, or a boundary node 24 between zones 14. Further, no network device 12 can perform routing protocol operations (e.g., respond to a route request (RREQ) message, forward reachability information, etc.) unless it is the destination for the route request (i.e., the route request target node), or an active node 16.

Hence, the example embodiments optimize maintaining network connectivity between wireless network devices 12 based on ensuring that the network device 12 having the maximum power 22 among other neighboring network devices is the active node 16 for the zone 14. The neighboring network devices 12 also can periodically transmit, via their respective wireless network interfaces circuit 18 advertisements (e.g., "hello packets") 28, illustrated in FIG. 3, enabling each network device to determine the relative power of each network device 12 within a zone 14.

Figure 3:
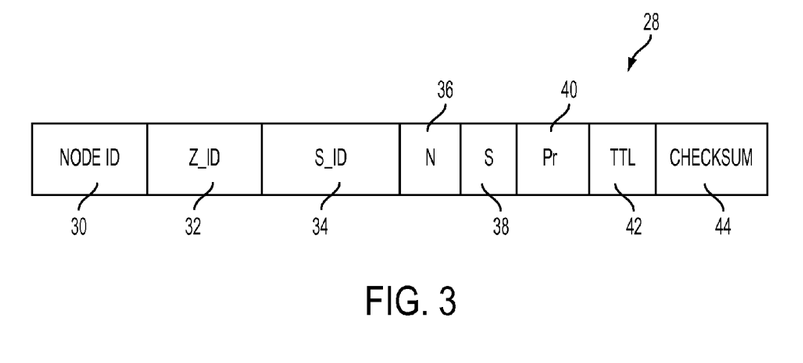
FIG. 3 illustrates an example advertisement message output by any one of the wireless network devices of FIG. 1 for establishing a zone of a wireless mobile ad hoc network, according to an example embodiment.

As illustrated in FIG. 3, each hello packet 28 transmitted by a network device 12 can include: a node identifier (Node ID) 30 that uniquely identifies the wireless network device 12 transmitting the hello packet 28; a zone identifier (Z_ID) 32 that identifies the propagation zone 14 to which the network device 12 belongs (boundary nodes 24 can output multiple hello packets 28 identifying membership in the respective zones 14); a standby node identifier (S_ID) 34 that identifies the standby node 20 for the zone 14 specified in the zone identifier field 32; an active node flag ("N") 36 that is set if the transmitting network device 12 identified in the node identifier field 30 is the active node 16; a standby node flag ("S") 38 that is set if the transmitting network device 12 identified in the node identifier field 30 is the standby node 16; the remaining power value (Pr) 40 specifying the remaining battery power 22 for the transmitting network device 12; a time to live field (TTL) 42; and a checksum field 44.

Figure 4:
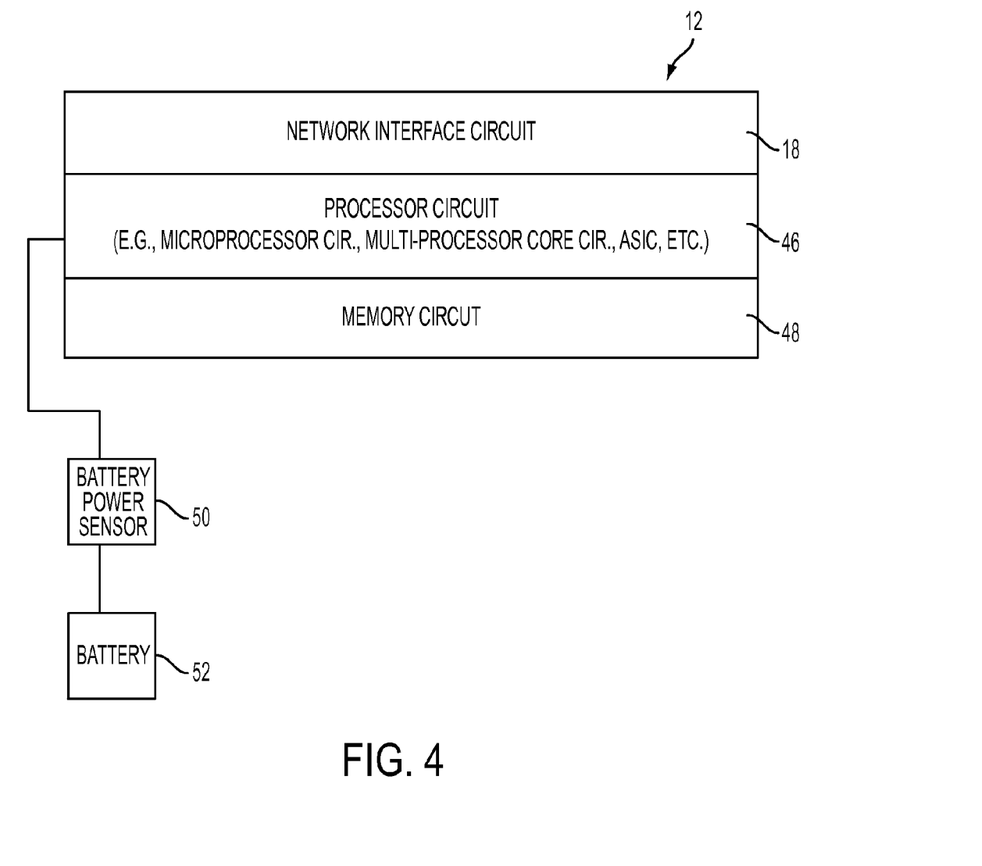
FIG. 4 illustrates an example wireless network device of FIG. 1, according to an example embodiment.

FIG. 4 illustrates an example wireless network device 12 of FIG. 1, according to an example embodiment. The wireless network device 12 includes a wireless network interface circuit 18 configured for sending and receiving wireless data messages, for example the hello message 28 of FIG. 3, wireless data packets, etc. The wireless network device 12 also includes a processor circuit 46, a memory circuit 48, a battery-powered sensor 50 configured for detecting the remaining power 22 of a battery 52.

The network interface circuit 18 can include one or more distinct physical layer transceivers for communication with any one of the other network devices 12. The processor circuit 46 can be configured for executing any of the operations described herein, and the memory circuit 48 can be configured for storing any data or data packets as described herein, for example storage of data packets, reachability information based on received hello messages 28, etc.

Any of the disclosed circuits of the wireless network device 12 (including the network interface circuit 18, the memory circuit 48, the processor circuit 46, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

Figure 5:
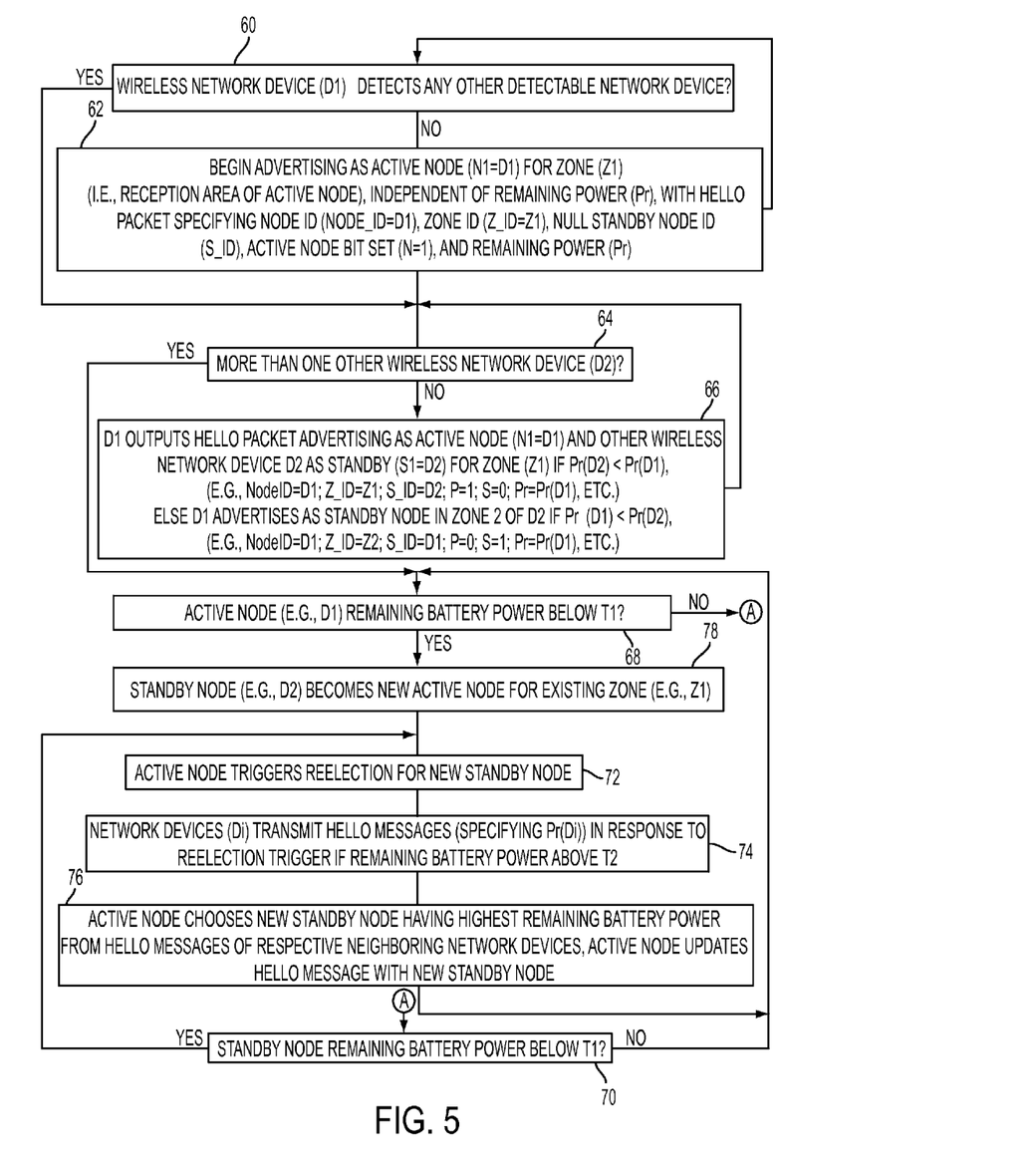
FIG. 5 illustrates an example method of one or more wireless network devices establishing a zone of a wireless mobile ad hoc network, according to an example embodiment.
Figure 6:
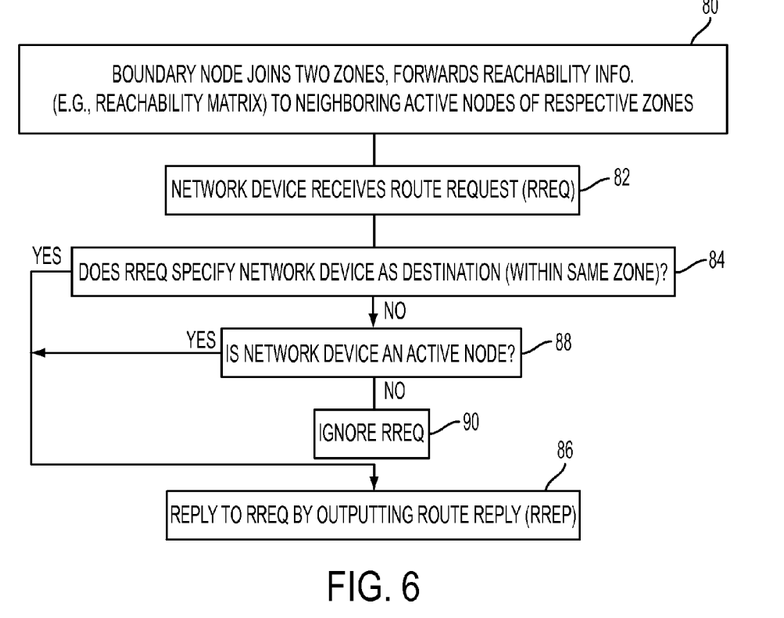
FIG. 6 illustrates an example sharing of reachability information by an active node of a zone and/or a boundary node belonging to two zones, according to an example embodiment.
Figure 7:
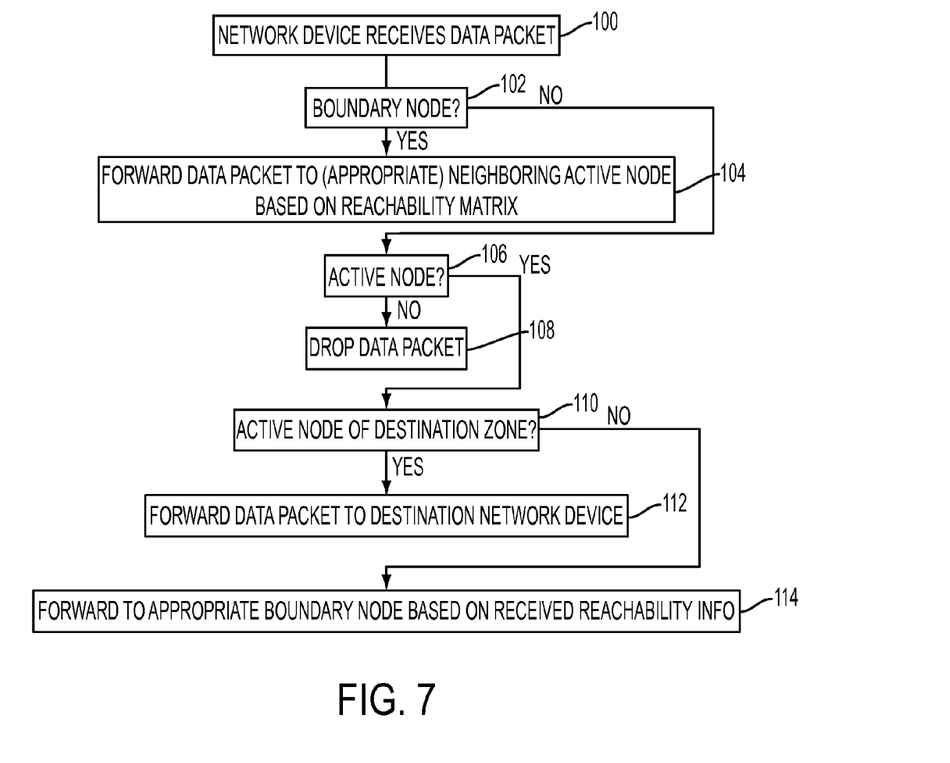
FIG. 7 illustrates an example forwarding of a data packet within one or more zones of FIG. 1 by an active node, according to an example embodiment.

FIG. 5 illustrates an example method of one or more wireless network devices 12 establishing a zone 14 of a wireless mobile ad hoc network 10, according to an example embodiment. FIG. 6 illustrates an example sharing of reachability information by an active node 16 of a zone 14 and/or a boundary node 24 belonging to two zones 14, according to an example embodiment. FIG. 7 illustrates an example forwarding of a data packet within one or more zones 14 of FIG. 1 by an active node 12, according to an example embodiment. The operations described with respect to any of the FIGS. 1-7 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-7 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 5, network zone creation can begin based on the processor circuit 46 of any wireless network device 12 identifying whether there is any other detectable wireless network device 12 that advertises a higher advertised remaining power 22 and the corresponding remaining power 22 as detected by the battery-powered sensor 50 in the wireless network device 12. For example, the processor circuit 46 of a wireless network device "D1" 12 can determine in operation 60 whether any other detectable network devices 12 are detected. The processor circuit 46 in operation 62 can begin advertising as the active node (e.g., "N_Z1") 16 for the zone (e.g., "Z1") 14, independent of the remaining battery power value 22 detected by the battery-powered sensor 50, in response to detecting no other detectable wireless network device 12. Hence, any wireless network device 12 that does not detect any other wireless network device 12 can create its own propagation zone 14 in operation 62. As described previously with respect to FIG. 3, the processor circuit 46 can begin advertising within its zone (i.e., reception area) 14 based on outputting in operation 62 a hello packet 28 specifying its node ID (e.g., Node_ID=D1) 30, its zone ID (e.g., Z_ID=Z1) 32, a null value for the standby node ID 34, the active node bit 36 set, the standby node bit 38 cleared, the power value 40 specifying the remaining battery power 22 as detected by the battery-powered sensor 50, and the appropriate time to live value 42 and checksum value 44.

If in operation 60 the wireless network device "D1" 12 (operating as the active node 16) detects another detectable wireless network device (e.g., "D2") 12, and if in operation 64 the processor circuit 46 of the active node 16 detects only the one other wireless network device "D2" 12 (i.e., there is no more than the one other wireless network device), the processor circuit 46 of the active node 16 can continue to operate in operation 66 as the active node 16 based on the other wireless network device "D2" 12 advertising a lower advertised remaining power (Pr(D2)) 40 than the corresponding remaining power (Pr(D1)) 22 detected by the battery-powered sensor 50 (i.e., Pr(D2)<Pr(D1)). Hence, if the other wireless network device "D2" 12 advertises a lower power value (i.e., Pr(D2)<Pr(D1)), the processor circuit 46 of the active node 16 can output a hello packet 28 advertising itself as the active node (N_Z1=D1) and the other wireless network device "D2" as the standby node 20 (S_Z1=D2) for the zone "Z1" 14.

Alternately, if in operation 66 the other wireless network device "D2" 12 advertises a higher power value (i.e., Pr(D1) <Pr(D2)), the other wireless network device "D2" 12 can be configured for initially outputting a hello message 28 that specifies its own corresponding zone identifier (Zone 2), in which case the wireless network device "D1" 12 responds in operation 66 by outputting a modified hello packet 28 advertising the wireless network device "D1" 12 as the standby node 20 for the zone established by the other wireless network device "D2" 12.

Hence, the network devices "D1" and "D2" 12 can output respective hello messages 28 for identification of the active node 16 and standby node 20 associated with the zone 14. Further, the identification of the active node 16 and standby node 20 within the zone 14 can disregard the first of threshold "T1" 24a if there are no other wireless network devices 12 within the zone 14.

In response to detecting in operation 64 another wireless network device 12 in addition to the standby node 20, the processor circuit 46 of the active node 12 can determine in operation 68 whether its remaining battery power 22 has fallen below the first threshold "T1" 24a: if the remaining battery power 22 of the active node 12 has not fallen below the first threshold "T1" 24a, the processor circuit 46 of the active node 12 can determine in operation 70 if the remaining battery power value 40 for the standby node 20 has fallen below the first threshold "T1" 24a.

Assuming the remaining battery power 22 of the standby node 20 (as specified by the power value field (Pr) 40 in the hello packet 20 received from the standby node 20) has fallen below the first threshold "T1" 24a, the processor circuit 46 of the active node 16 can trigger reelection for a new standby node in operation 72 to determine whether another wireless network device 12 has a higher power value 22. The active node 16 can trigger reelection to cause a search to find a new standby node, for example, based on broadcasting a request for hello packets 28. Any network device 12 within the zone 14 can detect the request and respond by transmitting in operation 74 a corresponding hello message 28 specifying the advertised remaining power in the power field 40. The processor circuit 46 of the active node 16 can choose in operation 76 a new standby node 12 having the highest remaining battery power from among the neighboring network devices 12, and in response output an updated hello message 28 specifying the standby node identifier 34 for the new standby node 20.

Assuming in operation 68 that the processor circuit 46 of the active node 12 detects that its remaining battery power 22 as detected by the battery-powered sensor 50 is below the first threshold "T1" 24a, the active node 12 in operation 78 can alert the standby node (e.g., "D2") 20 that it should become the new active node for the existing zone 14; alternately, the standby node (e.g., "D2") 20 can detect from the hello message 28 output from the active node (e.g., "D1") 16 that the active node battery power 22 is less than the standby node battery power 22, and in response send a request to the active node "D1" to transfer active node status to the existing standby node 20. Other arrangements for enabling the prior standby node to become the new active node for the existing zone 14 in operation 78 can be employed. In response to changing the standby node to become the new active node in operation 78, the new active node triggers reelection for a new standby node in operation 72, for execution of operations 74 and 76 for choosing a new standby node 20.

As illustrated in FIG. 5, the periodic transmission of hello messages 28 by each of the network devices 12 in a propagation zone 14 ensures that the network devices 12 having the highest power values can be elevated to active and standby status if the current active or standby nodes have remaining battery power values 22 that fall below the first threshold "T1" 24*a*, ensuring that network devices 12 having lower remaining battery power 22 have reduced operational requirements within the mobile ad hoc network 10.

FIG. 6 illustrates the forwarding of reachability information, according to an example embodiment. According to an example embodiment, a boundary node 24, in response to joining two or more zones (e.g., "Z1" and "Z2") 14, can forward in operation 80 any stored reachability information within its reachability matrix to the neighboring active nodes 16 of the respective zones 14. For example, the processor circuit 46 of each boundary node "D5" and "D6" can store in its corresponding memory circuit 48 reachability information based on the received hello messages 28 from any of the network devices 12 in the respective zones 14 to which the boundary node 24 belongs. Hence, the boundary node "D5" and/or "D6" in operation 80 can forward reachability information to the active node "N_Z1" 16 of zone "Z1" 14 that the network devices "D7", "D8", "D9", and "D10" in zone "Z2" each are reachable via the corresponding boundary node "D5" and/or "D6" 24; similarly, the boundary node "D5" and/or "D6" in operation 80 can forward reachability information to the active node "N_Z2" 16 of zone "Z2" 14 that the network devices "D1", "D2", "D3", and "D4" 12 each are reachable via the corresponding boundary node "D5" and/or "D6" 24. Hence, each of the active nodes 16 can add the reachability information to their respective memory circuits 48 to enable inter-zone communications via the boundary nodes 24. In one embodiment, the active nodes 16 also can send to the boundary node 24 reachability information for their own zone 14 or another remote zone 14 (provided by another boundary node 24), enabling a chain of zones 14 to be connected.

Network routing information is exchanged in the mobile ad hoc network 10 based on a network device 12 sending a route request (RREQ): if in operation 82 any network device 12 receives a route request, and if in operation 84 the request specifies the receiving network device as the destination for the route request (and assuming both the source of the route request and the network device receiving the route request are within the same zone 14 as neighboring network devices), the network device 12 as the target of the route request can respond by replying in operation 86 to the neighboring network device 12 by outputting a route reply (RREP).

If in operation 84, however, the route request specifies another network device as the target destination, then any network device 16 receiving the route request for another target destination device can respond to the route request only if in operation 88 the receiving network device is an active node. Hence, if a network device receiving the route request is not an active node or the target destination, the network device must ignore the route request in operation 90. Hence, routing operations are minimized by limiting route responses only to targeted destinations that are single hop neighbors with the route request, or active nodes 16.

FIG. 7 illustrates an example method of forwarding data packets by the active nodes 16, according to an example embodiment. In response to a network device 12 receiving a data packet in operation 100, if in operation 102 the network device 12 receiving the data packet is a boundary node 24, the boundary node in operation 104 can forward the data packet to the appropriate neighboring active node 16 based on its internal reachability matrix. If in operation 102 the network device 12 receiving the data packet is not a boundary node and not an active node 16 in operation 106, then the network device 12 must drop the data packet in operation 108.

If in operation 106 the network device is an active node 16 for a zone 14, the processor circuit 46 of the active node 16 determines whether it is the active node for the destination zone in operation 110. If the active node 16 is the active node for the destination zone containing the destination network device 12, the processor circuit 46 outputs the data packet to its network interface circuit 18 for forwarding of the data packet to the destination network device in operation 112; however if in operation 110 the active node 16 does not reside in the destination zone, the active node 1640 data packet to the appropriate boundary node 24 in operation 114, based on the received reachability information, for delivery or the destination zone 14. If an active node 16 determines that a destination zone 14 is reachable via multiple boundary nodes (e.g., "D5" and "D6"), the active node 16 can choose the boundary node 24 having the highest relative battery power 22. The active node 16 also can choose to no longer use a boundary node 24 if the corresponding advertised battery power value 40 falls blows the second threshold "T2" 24*b*.

According to example embodiments, network operations including exchange of reachability information and forwarding of data packets is limited to network devices 12 having the highest remaining battery power 22, while network devices below a lower threshold 24*b* cannot negotiate for active or standby node status, in order to conserve power requirements. Hence, the example embodiments optimize power efficiency by minimizing power consumption in wireless network devices having reduced battery power.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
  identifying, by a wireless network device, whether any other detectable network device advertises a higher advertised remaining power than a corresponding remaining power in the wireless network device; and
  the wireless network device advertising as an active node for a zone of a wireless mobile ad hoc network, based on no other detectable network device advertising the higher advertised remaining power;
  wherein the advertising includes the wireless network device in response to detecting only one other wireless network device, advertising as the active node and the other wireless network device as a standby node for the zone, based on the other wireless network device advertising a lower advertised remaining power than the corresponding remaining power in the wireless network device.

2. The method of claim 1, wherein the advertising includes the wireless network device advertising as the active node for the zone, independent of the corresponding remaining power in the wireless network device, in response to detecting no other detectable network device.

3. The method of claim 1, wherein:
the advertising includes maintaining the advertising of the wireless network device as the active node and the other wireless network device as the standby node for the zone while the corresponding remaining power is above a first prescribed threshold if a plurality of other network devices are detected;
the method further including:
in response to the wireless network device detecting the corresponding power has fallen below the first prescribed threshold, setting the standby node as the active node, causing a search to find a new standby node among the other network devices in the zone.

4. The method of claim 1, further comprising:
finding a second wireless network device having a highest relative advertised remaining power relative to other wireless network devices detected in the zone; and
advertising the second wireless network device as a standby node for the zone in response to the second wireless network device having the highest relative advertised remaining power relative to the other wireless network devices detected in the zone.

5. The method of claim 1, further comprising:
receiving reachability information from a wireless network device serving as a boundary node between the zone and a second zone; and
forwarding a received data packet, received from a neighboring network device in the zone, to the boundary node for delivery to the second zone based on the reachability information.

6. The method of claim 5, further comprising:
receiving a transmitted data packet from the boundary node; and
forwarding the transmitted data packet from one of a neighboring network device in the zone or a second boundary node for a third zone, based on reachability information stored in the wireless network device for a destination address specified in the transmitted data packet.

7. An apparatus comprising:
a battery power sensor configured for detecting a remaining power of a battery;
a wireless network interface circuit configured for receiving wireless messages from any wireless network devices; and
a processor circuit configured for identifying whether any other detectable network device advertises a higher advertised remaining power than a corresponding remaining power detected by the battery power sensor, the processor circuit further configured for generating a message, for output by the wireless network interface circuit, advertising the apparatus as an active node for a zone of a wireless mobile ad hoc network, based on no other detectable network device advertising the higher advertised remaining power;
wherein the processor circuit, in response to detecting only one other wireless network device, is configured for advertising the apparatus as the active node and the other wireless network device as a standby node for the zone, based on the other wireless network device advertising a lower advertised remaining power than the corresponding remaining power detected by the battery power sensor.

8. The apparatus of claim 7, wherein the processor circuit is configured for advertising as the active node for the zone, independent of the corresponding remaining power detected by the battery power sensor, in response to detecting no other detectable network device.

9. The apparatus of claim 7, wherein:
the processor circuit is configured for maintaining the advertising of the apparatus as the active node and the other wireless network device as the standby node for the zone while the corresponding remaining power is above a first prescribed threshold if a plurality of other network devices are detected;
the processor circuit is further configured for setting the standby node as the active node in response to detecting the corresponding power detected by the battery power sensor has fallen below the first prescribed threshold, and causing a search to find a new standby node among the other network devices in the zone.

10. The apparatus of claim 7, wherein the processor circuit is configured for:
finding a second wireless network device having a highest relative advertised remaining power relative to other wireless network devices detected in the zone; and
advertising the second wireless network device as a standby node for the zone in response to the second wireless network device having the highest relative advertised remaining power relative to the other wireless network devices detected in the zone.

11. The apparatus of claim 7, wherein the processor circuit is further configured for:
receiving reachability information from a wireless network device serving as a boundary node between the zone and a second zone; and
forwarding a received data packet, received from a neighboring network device in the zone, to the boundary node for delivery to the second zone based on the reachability information.

12. The apparatus of claim 11, wherein the processor circuit further is configured for:
receiving a transmitted data packet from the boundary node; and
forwarding the transmitted data packet from one of a neighboring network device in the zone or a second boundary node for a third zone, based on reachability information stored in the wireless network device for a destination address specified in the transmitted data packet.

13. Logic encoded in one or more non-transitory tangible media for execution by a machine and when executed by the machine operable for:
identifying, by a wireless network device, whether any other detectable network device advertises a higher advertised remaining power than a corresponding remaining power in the wireless network device; and
the wireless network device advertising as an active node for a zone of a wireless mobile ad hoc network, based on no other detectable network device advertising the higher advertised remaining power;
wherein the advertising includes the wireless network device, in response to detecting only one other wireless network device, advertising as the active node and the other wireless network device as a standby node for the zone, based on the other wireless network device advertising a lower advertised remaining power than the corresponding remaining power in the wireless network device.

14. The logic of claim 13, wherein the advertising includes the wireless network device advertising as the active node for the zone, independent of the corresponding remaining power in the wireless network device, in response to detecting no other detectable network device.

15. The logic of claim 13, wherein:
the advertising includes maintaining the advertising of the wireless network device as the active node and the other wireless network device as the standby node for the zone while the corresponding remaining power is above a first prescribed threshold if a plurality of other network devices are detected;
the logic further operable for:
in response to the wireless network device detecting the corresponding power has fallen below the first prescribed threshold, setting the standby node as the active node, causing a search to find a new standby node among the other network devices in the zone.

16. The logic of claim 13, further operable for:
finding a second wireless network device having a highest relative advertised remaining power relative to other wireless network devices detected in the zone; and
advertising the second wireless network device as a standby node for the zone in response to the second wireless network device having the highest relative advertised remaining power relative to the other wireless network devices detected in the zone.

17. The logic of claim 13, further operable for:
receiving reachability information from a wireless network device serving as a boundary node between the zone and a second zone; and
forwarding a received data packet, received from a neighboring network device in the zone, to the boundary node for delivery to the second zone based on the reachability information.

\* \* \* \* \*